(12) United States Patent
Guo et al.

(10) Patent No.: US 9,058,826 B1
(45) Date of Patent: Jun. 16, 2015

(54) DATA STORAGE DEVICE DETECTING FREE FALL CONDITION FROM DISK SPEED VARIATIONS

(71) Applicant: Western Digital Technologies, Inc., Irvine, CA (US)

(72) Inventors: Wei Guo, Fremont, CA (US); Jianguo Zhou, Foothill Ranch, CA (US); Yiming Chen, Riverside, CA (US); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/194,059

(22) Filed: Feb. 28, 2014

Related U.S. Application Data (60) Provisional application No. 61/939,643, filed on Feb. 13, 2014.

(51) Int. Cl.
*G11B 21/02* (2006.01)
*G11B 5/55* (2006.01)
*G11B 20/14* (2006.01)

(52) U.S. Cl.
CPC .............. *G11B 5/5565* (2013.01); *G11B 20/14* (2013.01)

(58) Field of Classification Search
None
See application file for complete search history.

(56) References Cited

U.S. PATENT DOCUMENTS

| | | | |
|---|---|---|---|
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |

(Continued)

OTHER PUBLICATIONS

B. Widrow, et al., "Adaptive noise cancelling: Principles and applications," Proc. IEEE, vol. 63, No. 12, Dec. 1975, pp. 1692-1716.

(Continued)

*Primary Examiner* — K. Wong (57) ABSTRACT

A data storage device is disclosed comprising a disk comprising data, and a head actuated over the disk. A timing signal is generated by reading the data from the disk, and a frequency generator is adjusted based on the timing signal to generate a disk locked clock substantially synchronized to a rotation speed of the disk. A free fall condition is detected based on the timing signal, and when the free fall condition is detected the head is parked.

32 Claims, 6 Drawing Sheets

(56) References Cited

U.S. PATENT DOCUMENTS

| | | |
|---|---|---|
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,768,066 B2 | 7/2004 | Wehrenberg |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,853,512 B2 | 2/2005 | Ozawa |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,271 B2 | 9/2005 | Inaji et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,059,182 B1 | 6/2006 | Ragner |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,158,334 B2 | 1/2007 | Iwashiro |
| 7,161,758 B2 | 1/2007 | Adapathya et al. |
| 7,180,703 B1 | 2/2007 | Subrahmanyam et al. |
| 7,184,230 B1 | 2/2007 | Chue et al. |
| 7,191,089 B2 | 3/2007 | Clifford et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,931 B2 | 9/2007 | Ehrlich |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,307,228 B2 | 12/2007 | Wehrenberg |
| 7,319,570 B2 | 1/2008 | Jia et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,369,345 B1 | 5/2008 | Li et al. |
| 7,382,576 B2 | 6/2008 | Okada et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,397,626 B2 | 7/2008 | Aoki et al. |
| 7,433,143 B1 | 10/2008 | Ying et al. |

(56) References Cited

U.S. PATENT DOCUMENTS

| | | |
|---|---|---|
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,469 B2 | 1/2009 | Cook et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,525,750 B2 | 4/2009 | Aoki et al. |
| 7,525,751 B2 | 4/2009 | Han et al. |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,365 B2 | 7/2009 | Noguchi et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,953 B1 | 9/2009 | Cerda et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 | 12/2009 | Supino et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,833 B2 | 2/2010 | Aoki et al. |
| 7,663,835 B1 | 2/2010 | Yu et al. |
| 7,667,743 B2 | 2/2010 | Uchida et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,690,253 B2 | 4/2010 | Noda et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,747,818 B1 | 6/2010 | Overby |
| 7,751,142 B2 | 7/2010 | Karakas |
| 7,752,351 B1 | 7/2010 | Overby |
| 7,760,461 B1 | 7/2010 | Bennett |
| 7,782,563 B2 | 8/2010 | Han et al. |
| 7,800,853 B1 | 9/2010 | Guo et al. |
| 7,800,856 B1 | 9/2010 | Bennett et al. |
| 7,800,857 B1 | 9/2010 | Calaway et al. |
| 7,802,476 B2 | 9/2010 | Lasalandra et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,865,253 B2 | 1/2011 | Harrington |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,164,847 B2 | 4/2012 | Shibata |
| 8,179,626 B1 | 5/2012 | Ryan et al. |
| 8,189,286 B1 | 5/2012 | Chen et al. |
| 8,213,106 B1 | 7/2012 | Guo et al. |
| 8,245,573 B2 | 8/2012 | Lammel |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,345,025 B2 | 1/2013 | Seibert et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,363,344 B2 | 1/2013 | Lin et al. |
| 8,390,367 B1 | 3/2013 | Bennett |
| 8,408,041 B2 | 4/2013 | Ten Kate et al. |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 2004/0213100 A1 | 10/2004 | Iwashiro |
| 2005/0088774 A1 | 4/2005 | Bahirat et al. |
| 2005/0096793 A1 | 5/2005 | Takeuchi |
| 2005/0213242 A1 | 9/2005 | Fujiki et al. |
| 2006/0291087 A1 | 12/2006 | Suh et al. |
| 2006/0291101 A1 | 12/2006 | Takaishi |
| 2007/0064334 A1 | 3/2007 | Jia et al. |

(56) References Cited

U.S. PATENT DOCUMENTS

| | | |
|---|---|---|
| 2008/0174900 A1 | 7/2008 | Abrishamchian et al. |
| 2009/0135516 A1 | 5/2009 | Takasaki et al. |
| 2010/0035085 A1 | 2/2010 | Jung et al. |
| 2010/0061007 A1 | 3/2010 | Matsushita et al. |
| 2010/0079906 A1 | 4/2010 | Wile et al. |
| 2011/0215940 A1 | 9/2011 | Bartholomeyczik et al. |
| 2012/0284493 A1 | 11/2012 | Lou et al. |
| 2012/0324980 A1 | 12/2012 | Nguyen et al. |
| 2013/0054180 A1 | 2/2013 | Barfield |
| 2013/0107394 A1 | 5/2013 | Lin et al. |
| 2013/0120147 A1 | 5/2013 | Narasimhan et al. |
| 2013/0120870 A1 | 5/2013 | Zhou et al. |
| 2013/0148240 A1 | 6/2013 | Ferris et al. |

OTHER PUBLICATIONS

B. Widrow, et al., "On Adaptive Inverse Control," Record of the Fifteenth Asilomar Conference on Circuits, Systems and Computers, pp. 185-189, Nov. 1981.

U.S. Appl. No. 14/033,136, filed Sep. 20, 2013, 21 pages.

U.S. Appl. No. 14/038,371, filed Sep. 26, 2013, 27 pages.

U.S. Appl. No. 14/099,886, filed Decmeber 6, 2013, 22 pages.

DATA STORAGE DEVICE DETECTING FREE FALL CONDITION FROM DISK SPEED VARIATIONS

CROSS REFERENCE TO RELATED APPLICATION(S)

This application claims the benefit of U.S. Provisional Application No. 61/939,643, filed on Feb. 13, 2014, which is hereby incorporated by reference in its entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
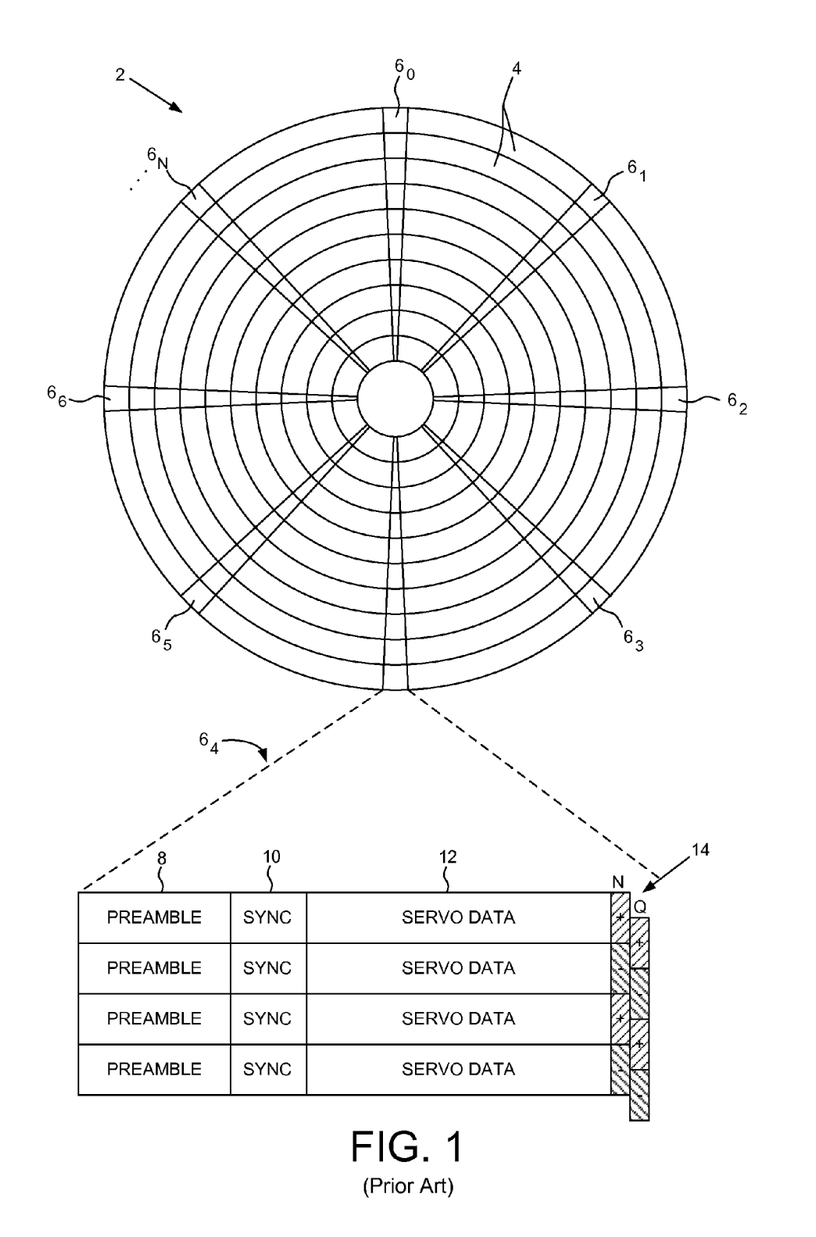
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
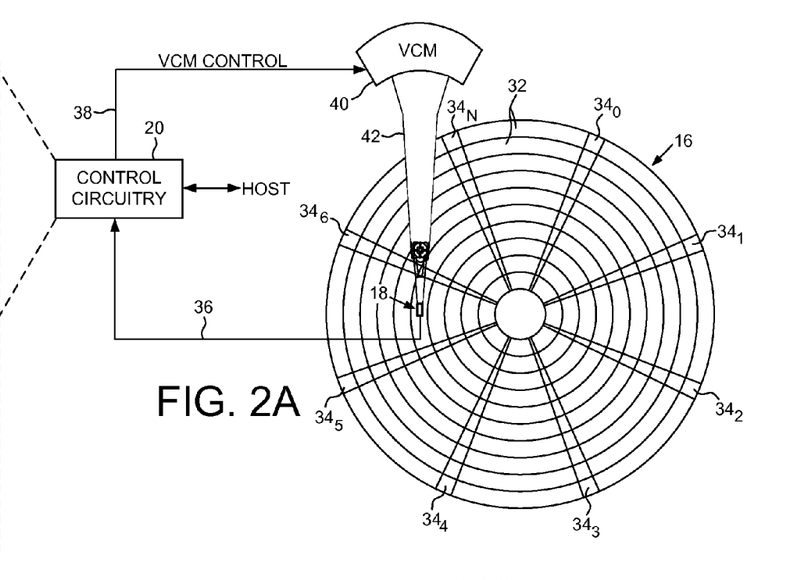
FIG. 2A shows a data storage device in the form of a disk drive according to an embodiment comprising a head actuated over a disk.

FIG. 2A shows a data storage device in the form of a disk drive according to an embodiment comprising a disk 16 comprising data, and a head 18 actuated over the disk 16. The disk drive further comprises control circuitry 20 (including timing control circuitry shown in FIG. 2B) configured to execute the flow diagram of FIG. 2C, wherein a timing signal is generated by reading the data from the disk (block 22), and a frequency generator is adjusted based on the timing signal to generate a disk locked clock substantially synchronized to a rotation speed of the disk (block 24). A free fall condition is detected based on the timing signal (block 26), and when the free fall condition is detected (block 28) the head is parked (block 30).

In the embodiment of FIG. 2A, a plurality of concentric servo tracks 32 are defined by embedded servo sectors $34_0$-$34_N$, wherein concentric data tracks are defined relative to the servo tracks 32 at the same or different radial density. The control circuitry 20 processes a read signal 36 emanating from the head 18 to demodulate the servo sectors and generate a position error signal (PES) representing an error between the actual position of the head and a target position relative to a target track. The control circuitry 20 filters the PES using a suitable compensation filter to generate a control signal 38 applied to a voice coil motor (VCM) 40 which rotates an actuator arm 42 about a pivot in order to actuate the head 18 radially over the disk 16 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

The disk drive of FIG. 2A may be utilized in any suitable electronic device, such as a laptop computer, tablet computer, or a consumer electronic device such as a smartphone, music player, etc. The disk drive may also be used as a portable backup drive such as a Universal Serial Bus (USB) portable disk drive. The portable nature of electronic devices means the disk drive may be subjected to a significant shock due to a user dropping the electronic device. Accordingly, in one embodiment the control circuitry 20 is configured to detect a free fall condition so that the head 18 may be parked before the impact shock causes the head 18 to slap the disk surface which may corrupt previously recorded data and/or damage the head 18. The head 18 may be parked in any suitable manner, such as by parking the head 18 on a ramp mounted at the outer periphery of the disk 16 or parking the head 18 on a landing zone on the disk 16 (e.g., near an inner diameter of the disk 16). In one embodiment, a timing signal generated by timing control circuitry is evaluated to detect a free fall condition, and in another embodiment a speed signal representing a rotation speed of the disk is evaluated to detect a free fall condition.

Figure 2B:
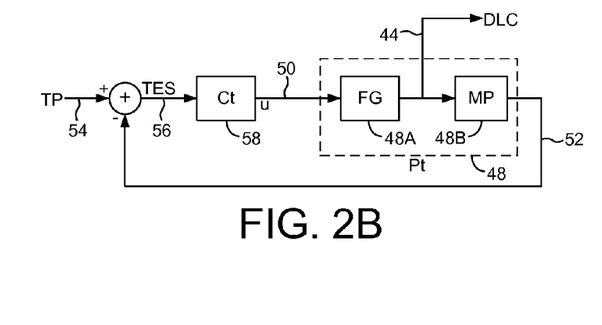
FIG. 2B shows control circuitry configured to generate a timing signal by reading data from the disk according to an embodiment.
Figure 2C:
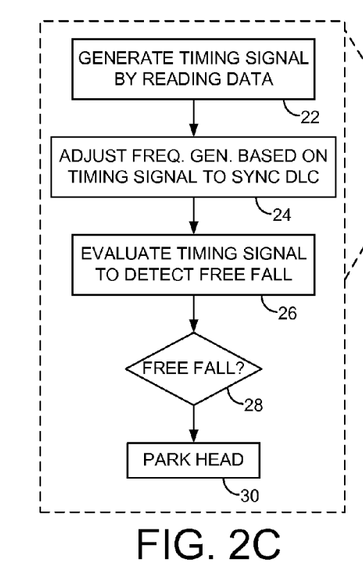
FIG. 2C is a flow diagram according to an embodiment wherein the timing signal is evaluated to detect a free fall condition.

FIG. 2B shows timing control circuitry according to an embodiment configured to generate a disk locked clock 44 substantially synchronized to a rotation speed of the disk. In the embodiment of FIG. 2B, a timing plant 48 comprises a frequency generator 48A for generating the disk locked clock 44 at a frequency based on a timing control signal 50. The timing plant 48 further comprises a block 48B for measuring a phase 52 of the disk locked clock 44 relative to a rotation speed of the disk 16. In one embodiment, the phase of the disk locked clock 44 may be measured relative to the frequency and/or phase of data read from the disk 16, such as data recorded in the servo sectors $34_0$-$34_N$. For example, a frequency of sync marks in the servo sectors and/or a phase of a periodic pattern in the servo sectors (e.g., a preamble or a servo burst) may be processed to measure the phase of the disk locked clock. The measured phase 52 is subtracted from a target phase 54 to generate a timing error signal 56. A suitable compensator 58 filters the timing error signal 56 to generate the timing control signal 50 applied to the frequency generator 48A, thereby adjusting the disk locked clock 44 so as to be synchronized with the rotation speed of the disk 16. In one embodiment a timing signal generated by the timing control circuitry is evaluated to detect a free fall condition, such as the timing error signal 56 and/or the timing control signal 50.

Figure 3A:
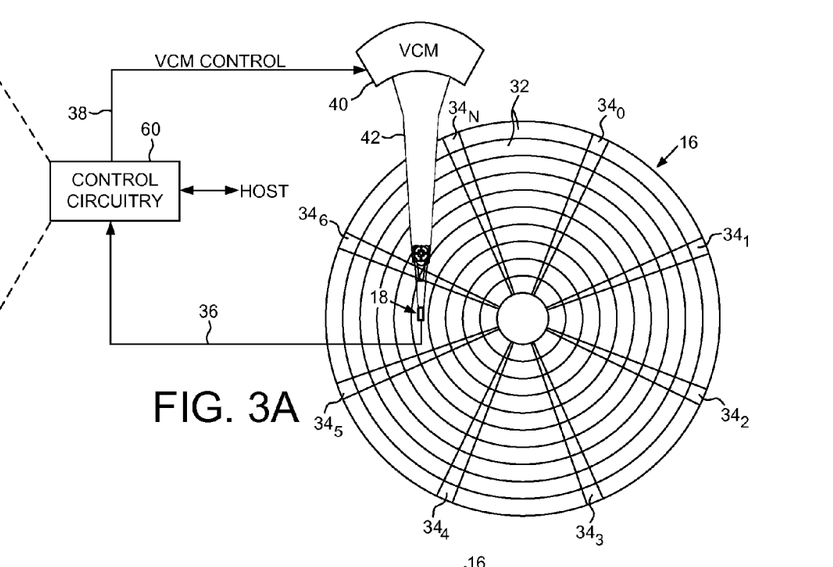
FIG. 3A shows a disk drive according to an embodiment comprising a head actuated over a disk.
Figure 3B:
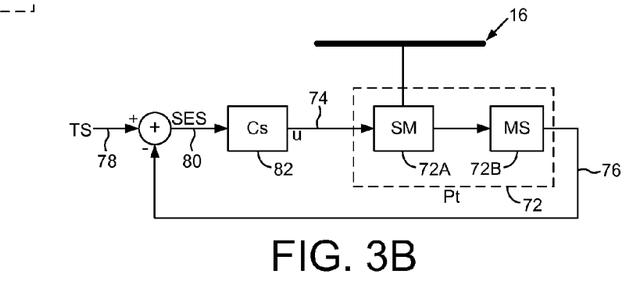
FIG. 3B shows control circuitry configured to generate a speed signal representing a rotation speed of the disk.
Figure 3C:
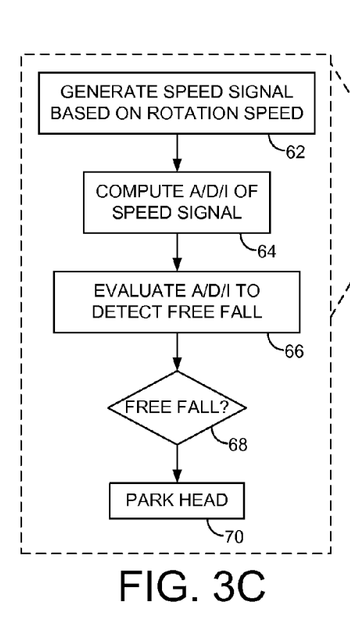
FIG. 3C is a flow diagram according to an embodiment wherein the speed signal is evaluated to detect a free fall condition.

FIG. 3A shows a disk drive according to an embodiment comprising a head 18 actuated over a disk 16 and control circuitry 60 (including speed control circuitry shown in FIG. 3B) configured to execute the flow diagram of FIG. 3C wherein a speed signal is generated representing a rotation speed of the disk (block 62). An absolute value of the speed signal, a derivative of the speed signal, and an integral of the speed signal is computed (block 64), and a free fall condition is detected based on the absolute value of the speed signal, the derivative of the speed signal, and the integral of the speed signal (block 66). When the free fall condition is detected (block 68), the head is parked (block 70).

FIG. 3B shows speed control circuitry according to an embodiment configured to rotate the disk 16 at a target rotation speed. In the embodiment of FIG. 3B, a speed plant 72 comprises a spindle motor 72A for rotating the disk 16 at a rotation speed based on a speed control signal 74. The speed plant 72 further comprises a block 72B for measuring a rotation speed of the disk 16, such as by evaluating the back electromotive force (BEMF) of the spindle motor 72A and/or evaluating a frequency of a disk locked clock synchronized to the frequency/phase of the servo sectors $34_0$-$34_N$. The measured rotation speed 76 is subtracted from a target rotation speed 78 to generate a speed error signal 80. A suitable compensator 82 filters the speed error signal 80 to generate the speed control signal 74 applied to the spindle motor 72A, thereby adjusting the rotation speed of the disk 16 to match the target rotation speed 78. In one embodiment a speed signal generated by the speed control circuitry is evaluated to detect a free fall condition, such as the speed error signal 80 and/or the speed control signal 74.

Figure 4:
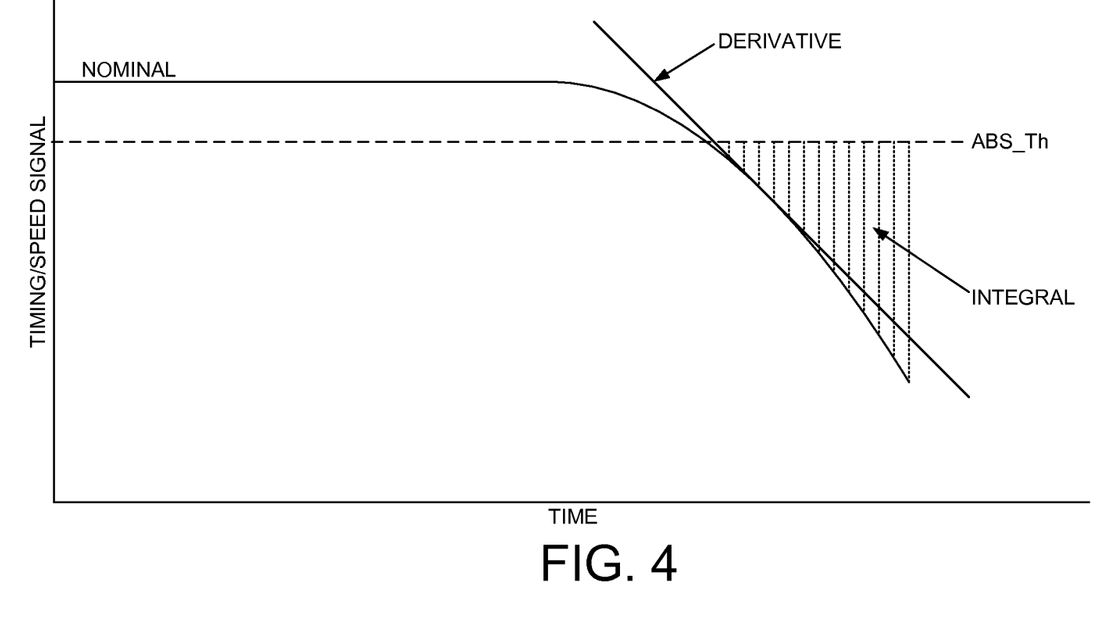
FIG. 4 illustrates an embodiment wherein an absolute value, derivative, and integral of the timing signal and/or speed signal are evaluated to detect a free fall condition.

FIG. 4 illustrates an embodiment wherein the timing signal of FIG. 2B and/or the speed signal of FIG. 3B are represented as a nominal value (e.g., zero) when the feedback loops converge to a steady state with the disk drive in a normal operating mode. When the disk drive is subject to a free fall condition, the timing/speed signal diverges from the nominal value shown in the example of FIG. 4 as transitioning to a negative value. In the example of FIG. 4, the timing/speed signal is illustrated as a noiseless signal but in practice the signals may be obfuscated by noise. In one embodiment, the noise in the timing/speed signal may be attenuated using suitable filtering, such as averaging or other low pass filtering, in order to improve the accuracy of the free fall detection.

As illustrated in FIG. 4, in one embodiment the control circuitry evaluates an absolute value, a derivative, and an integral of the timing/speed signal in order to detect a free fall condition. In one embodiment, a potential free fall condition is detected when the absolute value exceeds a threshold (ABS_Th shown in FIG. 4), wherein the control circuitry begins evaluating the derivative and the integral of the timing/speed signal in order to confirm the free fall condition before parking the head. In one embodiment, the free fall condition is confirmed based on the derivative and the integral so that the head is not parked unnecessarily which degrades the performance of the disk drive by interrupting the host commands.

Figure 5A:
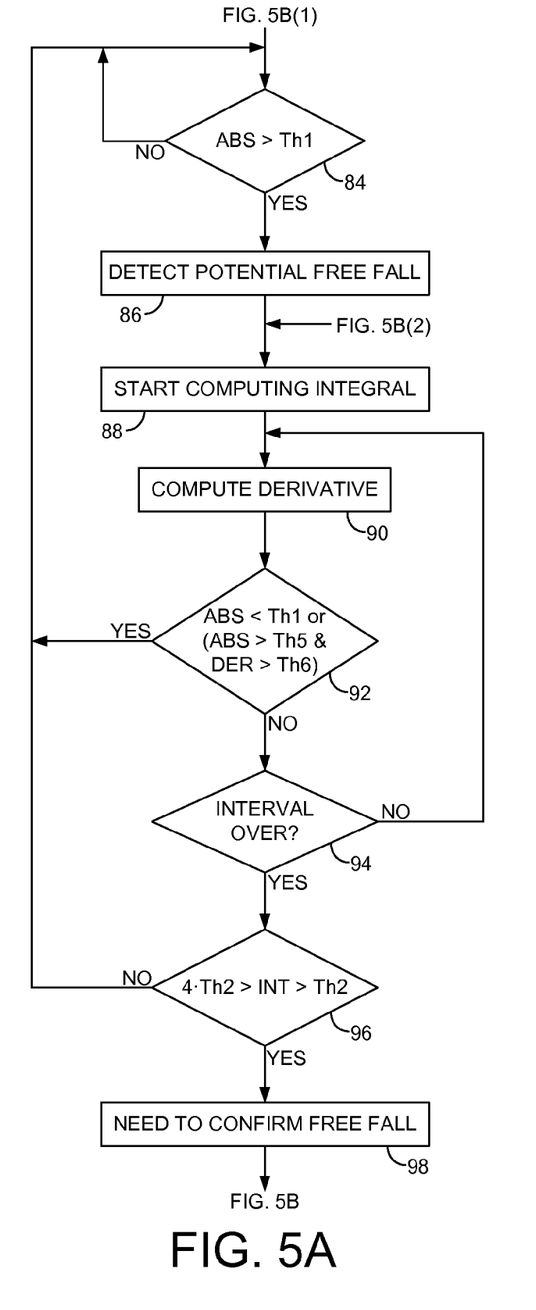
FIGS. 5A and 5B are a flow diagram according to an embodiment wherein a potential free fall condition is detected and then confirmed based on the absolute value, derivative, and integral of the timing signal and/or speed signal.
Figure 5B:
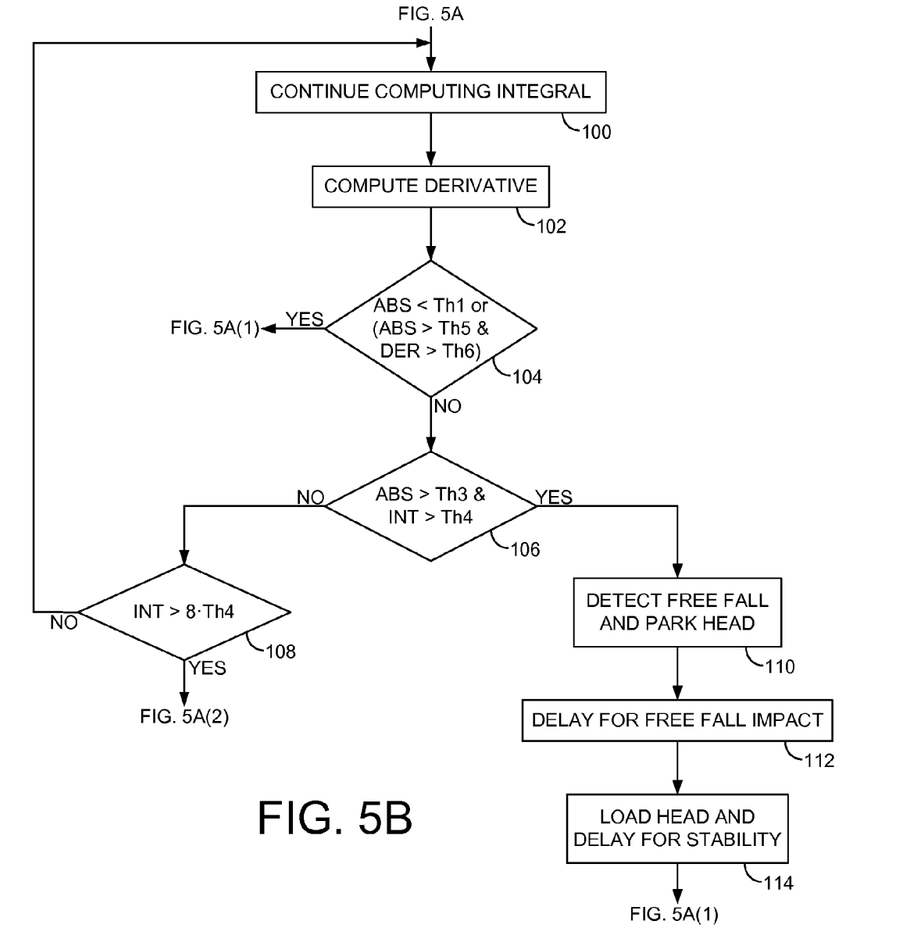

An example of this embodiment is illustrated in the flow diagram of FIGS. 5A and 5B wherein when the absolute value (ABS) of the timing/speed signal exceeds a threshold Th1 (block 84) a potential free fall condition is detected (block 86). The control circuitry then begins computing an integral of the timing/speed signal (block 88) as illustrated in FIG. 4. While computing the integral during a first interval, the control circuitry periodically computes a derivative of the timing/speed signal (block 90), such as computing the derivative each time the timing/speed signal is sampled. If during the first interval the absolute value falls below the threshold Th1 or the absolute value exceeds a threshold Th5 greater than Th1 and the derivative exceeds a threshold Th6, the control circuitry determines the potential free fall condition is a false free fall condition and the flow diagram resets to block 84.

If after the first interval (block 94) the integral of the timing/speed signal is less than a threshold 4*Th2 and greater than the threshold Th2, the control circuitry executes the flow diagram of FIG. 5B to further confirm the potential free fall condition. The control circuitry continues to compute the integral of the timing/speed signal (block 100) and continues to compute the derivative of the timing/speed signal (block 102). At the same time, if the absolute value falls below the threshold Th1 or the absolute value exceeds threshold Th5 and the derivative exceeds threshold Th6, the control circuitry determines the potential free fall condition is a false free fall condition and the flow diagram resets to block 84 (FIG. 5A). If during this second interval the integral exceeds a threshold 8*Th4 (which is greater than threshold Th2), the control circuitry determines the potential free fall condition is a false free fall condition and the flow diagram resets to block 88 (FIG. 5A) where the integral is reset to zero so that a potential free fall condition is still evaluated.

If the absolute value exceeds threshold Th3 and the integral exceeds threshold Th4 at block 106, the control circuitry confirms the free fall condition and parks the head (block 110). The control circuitry keeps the head parked for a delay to ensure the head is parked when the impact shock occurs (block 112). After the delay (and in one embodiment after detecting the impact shock), the control circuitry loads the head onto the disk and waits at block 114 for the speed/timing signal to converge to the steady state nominal value (e.g., zero in FIG. 4). The flow diagram is then reset to block 84 (FIG. 5A) thereby enabling the detection and reaction to future free fall conditions.

Any suitable values may be selected for the thresholds described in the flow diagram of FIGS. 5A and 5B. In one embodiment, the thresholds may be calibrated and then adapted over time based on the accuracy of the free fall detection algorithm. For example, the thresholds may be adjusted if a free fall condition is confirmed based on the timing/speed signal (thereby parking the head), but then determined to be a false free fall condition if an impact shock does not follow. Conversely, the thresholds may be adjusted if a free fall condition is not detected (or a potential free fall condition is determined to be a false free fall condition) yet an impact shock is detected. Accordingly, the thresholds may be adapted over time so as to optimize performance while minimizing the chance of damage to the disk and/or the head due to an impact shock.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising data;
   a head actuated over the disk; and
   control circuitry configured to:
      generate a timing signal by reading the data from the disk;
      adjust a frequency generator based on the timing signal to generate a disk locked clock substantially synchronized to a rotation speed of the disk;
      detect a free fall condition based on the timing signal; and
      park the head when the free fall condition is detected.

2. The data storage device as recited in claim 1, wherein the control circuitry is further configured to detect the free fall condition based on an absolute value of the timing signal.

3. The data storage device as recited in claim 1, wherein the control circuitry is further configured to detect the free fall condition based on a derivative of the timing signal.

4. The data storage device as recited in claim 1, wherein the control circuitry is further configured to detect the free fall condition based on an integral of the timing signal.

5. The data storage device as recited in claim 1, wherein the timing signal comprises a timing error signal filtered by a timing compensator.

6. The data storage device as recited in claim 1, wherein the timing signal comprises a timing control signal generated by filtering a timing error signal with a timing compensator.

7. A data storage device comprising:
   a disk;
   a head actuated over the disk; and
   control circuitry configured to:
      generate a speed signal representing a rotation speed of the disk;
      detect a free fall condition based on an absolute value of the speed signal, a derivative of the speed signal, and an integral of the speed signal; and
      park the head when the free fall condition is detected.

8. The data storage device as recited in claim 7, wherein the speed signal comprises a servo control signal applied to a spindle motor configured to rotate the disk.

9. The data storage device as recited in claim 7, wherein the speed signal comprises a speed error signal filtered by a servo compensator to generate a servo control signal applied to a spindle motor configured to rotate the disk.

10. The data storage device as recited in claim 7, wherein the speed signal comprises a timing signal used to adjust a frequency generator to generate a disk locked clock substantially synchronized to a rotation speed of the disk.

11. The data storage device as recited in claim 7, wherein the control circuitry is further configured to detect the free fall condition based on:
   the absolute value of the speed signal exceeding a first threshold; and
   the integral of the speed signal exceeding a second threshold.

12. The data storage device as recited in claim 7, wherein the control circuitry is further configured to:
   detect a potential free fall condition when the absolute value exceeds a first threshold; and
   confirm the potential free fall condition based on the integral exceeding a second threshold a first interval after the absolute value exceeds the first threshold.

13. The data storage device as recited in claim 12, wherein the control circuitry is further configured to determine the potential free fall condition is a false free fall condition when during the first interval the absolute value falls below the first threshold.

14. The data storage device as recited in claim 12, wherein the control circuitry is further configured to determine the potential free fall condition is a false free fall condition when during the first interval the derivative exceeds a third threshold and the absolute value exceeds a fourth threshold greater than the first threshold.

15. The data storage device as recited in claim 12, wherein the control circuitry is further configured to confirm the potential free fall condition based on the absolute value exceeding a third threshold and the integral exceeding a fourth threshold after the integral exceeds the second threshold.

16. The data storage device as recited in claim 15, wherein the control circuitry is further configured to determine the potential free fall condition is a false free fall condition when the integral exceeds a fifth threshold greater than the second threshold after the integral exceeds the second threshold.

17. A method of operating a data storage device comprising, the method comprising:
generating a timing signal by reading data from a disk;
adjusting a frequency generator based on the timing signal to generate a disk locked clock substantially synchronized to a rotation speed of the disk;
detecting a free fall condition based on the timing signal; and
parking the head when the free fall condition is detected.

18. The method as recited in claim 17, further comprising detecting the free fall condition based on an absolute value of the timing signal.

19. The method as recited in claim 17, further comprising detecting the free fall condition based on a derivative of the timing signal.

20. The method as recited in claim 17, further comprising detecting the free fall condition based on an integral of the timing signal.

21. The method as recited in claim 17, wherein the timing signal comprises a timing error signal filtered by a timing compensator.

22. The method as recited in claim 17, wherein the timing signal comprises a timing control signal generated by filtering a timing error signal with a timing compensator.

23. A method of operating a data storage device, the method comprising:
generating a speed signal representing a rotation speed of a disk;
detecting a free fall condition based on an absolute value of the speed signal, a derivative of the speed signal, and an integral of the speed signal; and
parking the head when the free fall condition is detected.

24. The method as recited in claim 23, wherein the speed signal comprises a servo control signal applied to a spindle motor configured to rotate the disk.

25. The method as recited in claim 23, wherein the speed signal comprises a speed error signal filtered by a servo compensator to generate a servo control signal applied to a spindle motor configured to rotate the disk.

26. The method as recited in claim 23, wherein the speed signal comprises a timing signal used to adjust a frequency generator to generate a disk locked clock substantially synchronized to a rotation speed of the disk.

27. The method as recited in claim 23, further comprising detecting the free fall condition based on:
the absolute value of the speed signal exceeding a first threshold; and
the integral of the speed signal exceeding a second threshold.

28. The method as recited in claim 23, further comprising:
detecting a potential free fall condition when the absolute value exceeds a first threshold; and
confirming the potential free fall condition based on the integral exceeding a second threshold a first interval after the absolute value exceeds the first threshold.

29. The method as recited in claim 28, further comprising determining the potential free fall condition is a false free fall condition when during the first interval the absolute value falls below the first threshold.

30. The method as recited in claim 28, further comprising determining the potential free fall condition is a false free fall condition when during the first interval the derivative exceeds a third threshold and the absolute value exceeds a fourth threshold greater than the first threshold.

31. The method as recited in claim 28, further comprising confirming the potential free fall condition based on the absolute value exceeding a third threshold and the integral exceeding a fourth threshold after the integral exceeds the second threshold.

32. The method as recited in claim 31, further comprising determining the potential free fall condition is a false free fall condition when the integral exceeds a fifth threshold greater than the second threshold after the integral exceeds the second threshold.

* * * * *